(12) United States Patent
Sakai

(10) Patent No.: US 11,752,979 B2
(45) Date of Patent: Sep. 12, 2023

(54) VEHICLE CLEANER NOZZLE AND METHOD OF ASSEMBLING VEHICLE CLEANER NOZZLE

(71) Applicant: KOITO MANUFACTURING CO., LTD., Tokyo (JP)

(72) Inventor: Masaru Sakai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 4 days.

(21) Appl. No.: 17/552,221

(22) Filed: Dec. 15, 2021

(65) Prior Publication Data

US 2022/0105905 A1   Apr. 7, 2022

Related U.S. Application Data

(62) Division of application No. 16/354,283, filed on Mar. 15, 2019, now Pat. No. 11,230,269.

(30) Foreign Application Priority Data

Mar. 15, 2018   (JP) ................................. 2018-047864

(51) Int. Cl.
  *B05B 15/72* (2018.01)
  *B08B 3/02* (2006.01)
  (Continued)

(52) U.S. Cl.
  CPC .............. *B60S 1/522* (2013.01); *B05B 15/72* (2018.02); *B60S 1/0848* (2013.01); *B60S 1/52* (2013.01);
  (Continued)

(58) Field of Classification Search
  None
  See application file for complete search history.

(56) References Cited

U.S. PATENT DOCUMENTS

| 2006/0038038 A1 | 2/2006 | Hagiwara |
| 2015/0151722 A1 | 6/2015 | Gokan et al. |

(Continued)

FOREIGN PATENT DOCUMENTS

| CN | 104470770 A | 3/2015 |
| CN | 106167001 A | 11/2016 |

(Continued)

OTHER PUBLICATIONS

Annen et al., JP2016155455A English Machine Translation.pdf, Sep. 1, 2016—Machine translation from Espacenet.com.*

(Continued)

*Primary Examiner* — Levon J Shahinian
(74) *Attorney, Agent, or Firm* — Osha Bergman Watanabe & Burton LLP

(57) ABSTRACT

A method of assembling a vehicle cleaner nozzle provided in a vicinity of a leading end of a piston accommodated to be movable forward and backward with respect to a cylinder so as to inject a cleaning medium on an object to be cleaned which is mounted on a vehicle includes: assembling a nozzle chip to a housing along a first direction so as to form a feedback flow path for swinging and injecting the cleaning medium by accommodating the nozzle chip in an interior of the housing; and assembling the housing in a state where the housing accommodates the nozzle chip to a holder supported by the piston along the first direction.

2 Claims, 10 Drawing Sheets

(51) Int. Cl.
  *B60S 1/08* (2006.01)
  *B60S 1/52* (2006.01)
  *B60S 1/56* (2006.01)
  *B60S 1/60* (2006.01)
  *G02B 27/00* (2006.01)

(52) U.S. Cl.
  CPC . *B60S 1/56* (2013.01); *B60S 1/60* (2013.01); *B08B 3/02* (2013.01); *G02B 27/0006* (2013.01)

(56) References Cited

U.S. PATENT DOCUMENTS

| | | |
|---|---|---|
| 2015/0166021 A1 | 6/2015 | Gokan et al. |
| 2016/0339875 A1 | 11/2016 | Ina et al. |
| 2017/0210304 A1 | 7/2017 | Davies et al. |
| 2019/0270432 A1 | 9/2019 | Ina |

FOREIGN PATENT DOCUMENTS

| | | |
|---|---|---|
| CN | 106536296 A | 3/2017 |
| EP | 2708426 A1 | 3/2014 |
| JP | 2006056366 A | 3/2006 |
| JP | 2013001246 A | 1/2013 |
| JP | 2016155455 A | 9/2016 |

OTHER PUBLICATIONS

Office Action issued in corresponding Chinese Application No. 201910157011.3; dated May 12, 2022 (17 pages).
Office Action issued in corresponding French Application No. 1902636; dated Jul. 20, 2022 (10 pages) with partial translation.
Office Action issued in corresponding Japanese Application No. 2018-047864; dated Jan. 25, 2022 (7 pages).

* cited by examiner

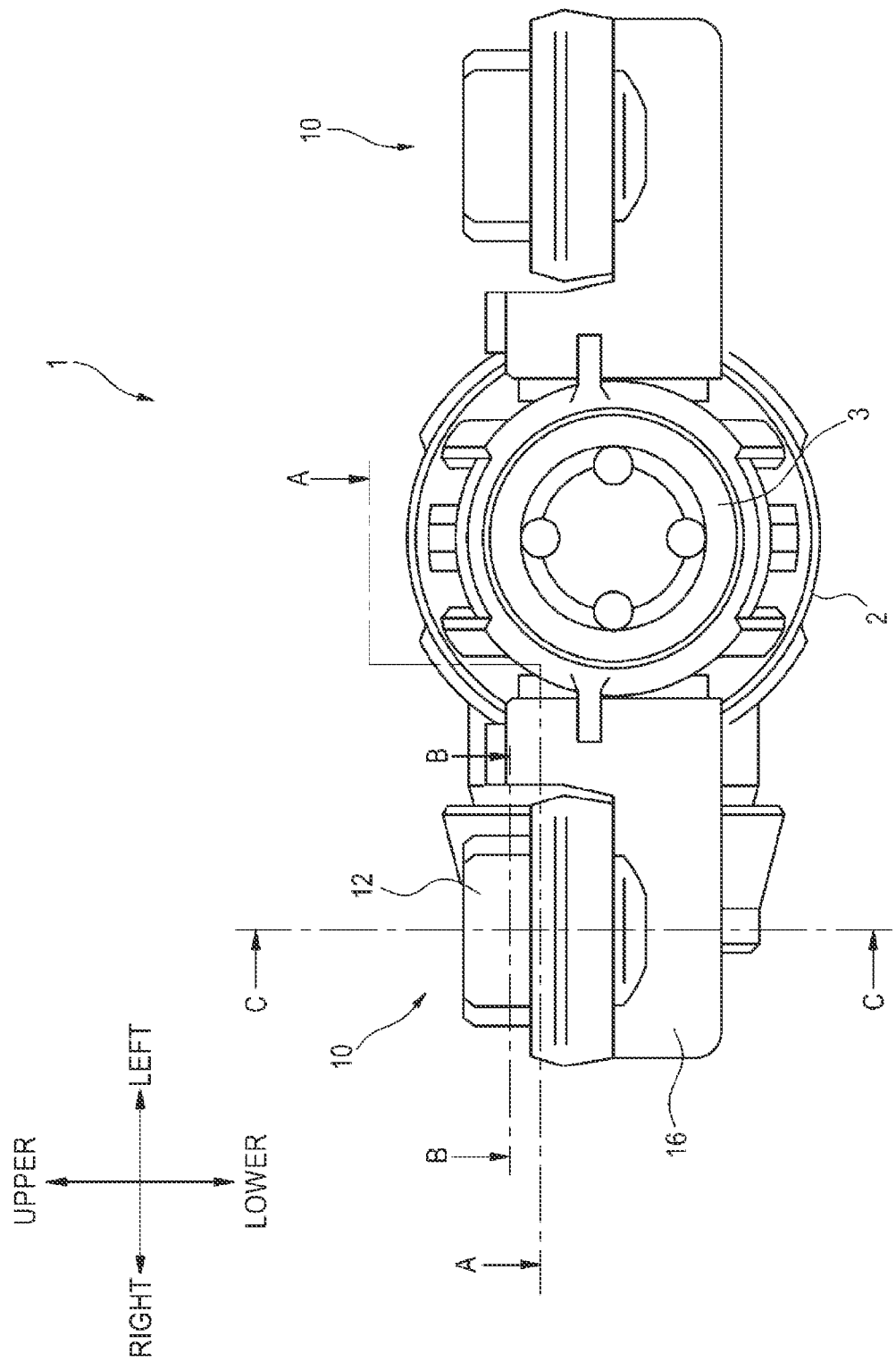

VEHICLE CLEANER NOZZLE AND METHOD OF ASSEMBLING VEHICLE CLEANER NOZZLE

CROSS-REFERENCE TO RELATED APPLICATION

This application is a divisional application of U.S. patent application Ser. No. 16/354,283 filed on Mar. 15, 2019, which is incorporated herein by reference in its entirety, and claims the benefit of priority from prior Japanese patent application No. 2018-047864, filed on Mar. 15, 2018, which is incorporated herein by reference in its entirety.

FIELD

The disclosure relates to a vehicle cleaner nozzle and a method of assembling the vehicle cleaner nozzle.

A nozzle for cleaning a lens of an in-vehicle camera is disclosed in Patent Document 1.

Patent Document 1: US 2015/0138357 A1

The nozzle disclosed in the Patent Document 1 is supported by a bracket attached to a camera module and a flow path for swinging and injecting a cleaning liquid from an injection port is formed in a nozzle chip accommodated in a space provided in a nozzle housing. Further size reduction is required for such nozzle that enables the swinging and injecting of the cleaning liquid.

SUMMARY

The disclosure aims to provide a vehicle cleaner nozzle which is capable of swinging and injecting a cleaning liquid and is small. Further, the disclosure aims to provide a method of assembling a vehicle cleaner nozzle, which is capable of improving the work efficiency during assembly.

In order to solve the problem, a vehicle cleaner nozzle is a vehicle cleaner nozzle for injecting a cleaning medium on an object to be cleaned which is mounted on a vehicle, the vehicle cleaner nozzle comprising:

a housing;

a nozzle chip accommodated in an interior of the housing; and a holder configured to support the housing in a state where the housing accommodates the nozzle chip, wherein a feedback flow path for swinging and injecting the cleaning medium is formed by accommodating the nozzle chip in the housing.

According to the vehicle cleaner nozzle of the disclosure, the feedback flow path of the cleaning medium is formed between the housing and the nozzle chip accommodated in the housing. Therefore, it is possible to provide the vehicle cleaner nozzle which is capable of swinging and injecting the cleaning medium and is small.

In order to solve the problem, a method of assembling a vehicle cleaner nozzle is a method of assembling a vehicle cleaner nozzle provided in a vicinity of a leading end of a piston accommodated to be movable forward and backward with respect to a cylinder so as to inject a cleaning medium on an object to be cleaned which is mounted on a vehicle, the method comprising:

a step of assembling a nozzle chip to a housing along a first direction so as to form a feedback flow path for swinging and injecting the cleaning medium by accommodating the nozzle chip in an interior of the housing, and a step of assembling the housing in a state where the housing accommodates the nozzle chip to a holder supported by the piston along the first direction.

According to the method of assembling the vehicle cleaner nozzle of the disclosure, it is possible to improve the work efficiency during assembly.

According to the disclosure, it is possible to provide the vehicle cleaner nozzle which is capable of swinging and injecting the cleaning medium and is small. Further, according to the disclosure, it is possible to provide the method of assembling the vehicle cleaner nozzle, which is capable of improving the work efficiency during assembly.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

BRIEF DESCRIPTION OF DRAWINGS

Exemplary embodiments of the disclosure will be described in detail based on the following figures, wherein:

FIG. 5 is a side view of the front side of the sensor cleaner;

DETAILED DESCRIPTION

Figure 1:
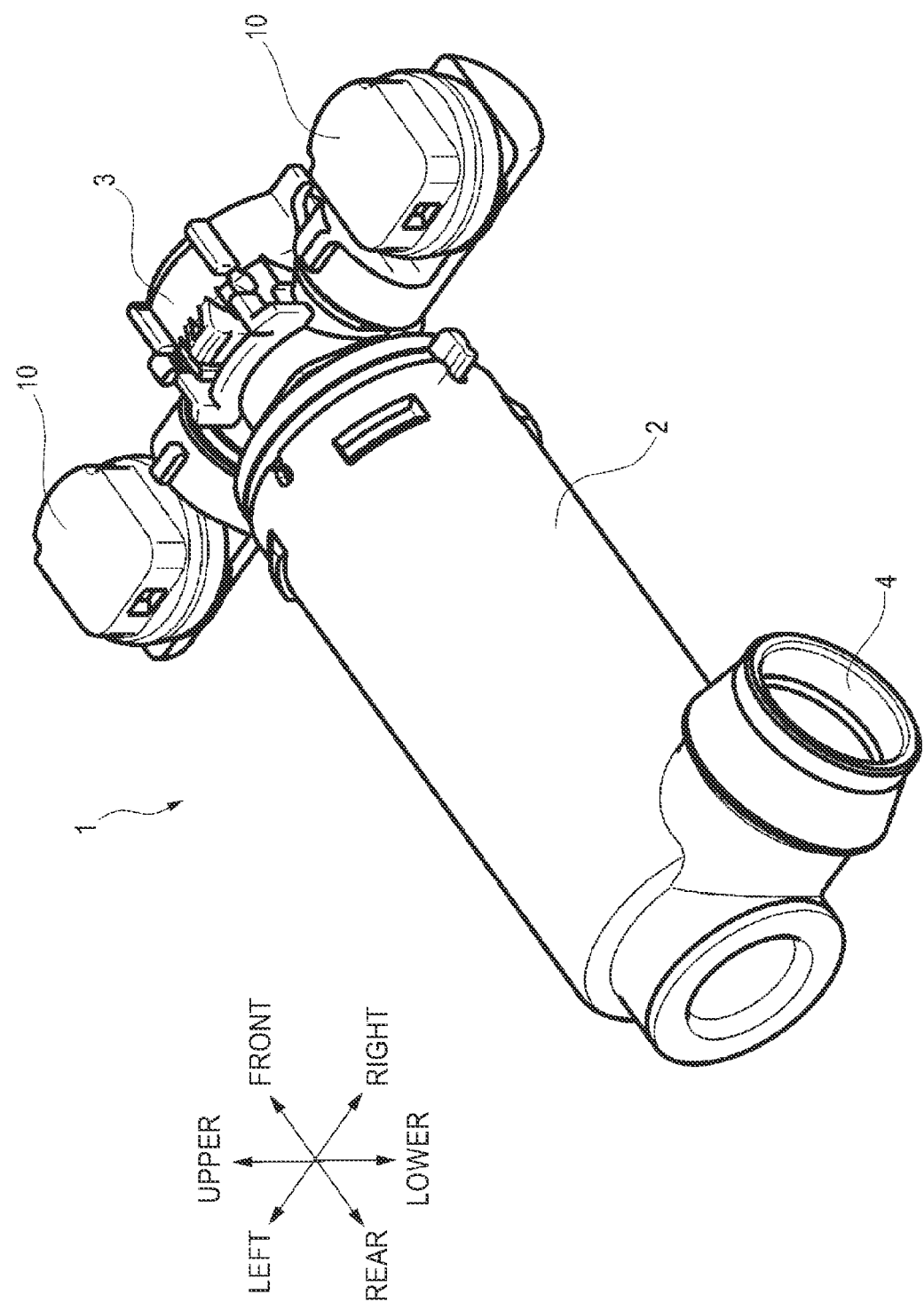
FIG. 1 is a perspective view of a sensor cleaner according to an embodiment of the disclosure.

An example of a sensor cleaner according to an embodiment of the disclosure will be described with reference to the drawings. Meanwhile, for the sake of convenience of explanation, the "left and right direction," the "front and rear direction" and the "upper and lower direction" in this example refer to relative directions set for the sensor cleaner shown in the drawings.

Figure 2:
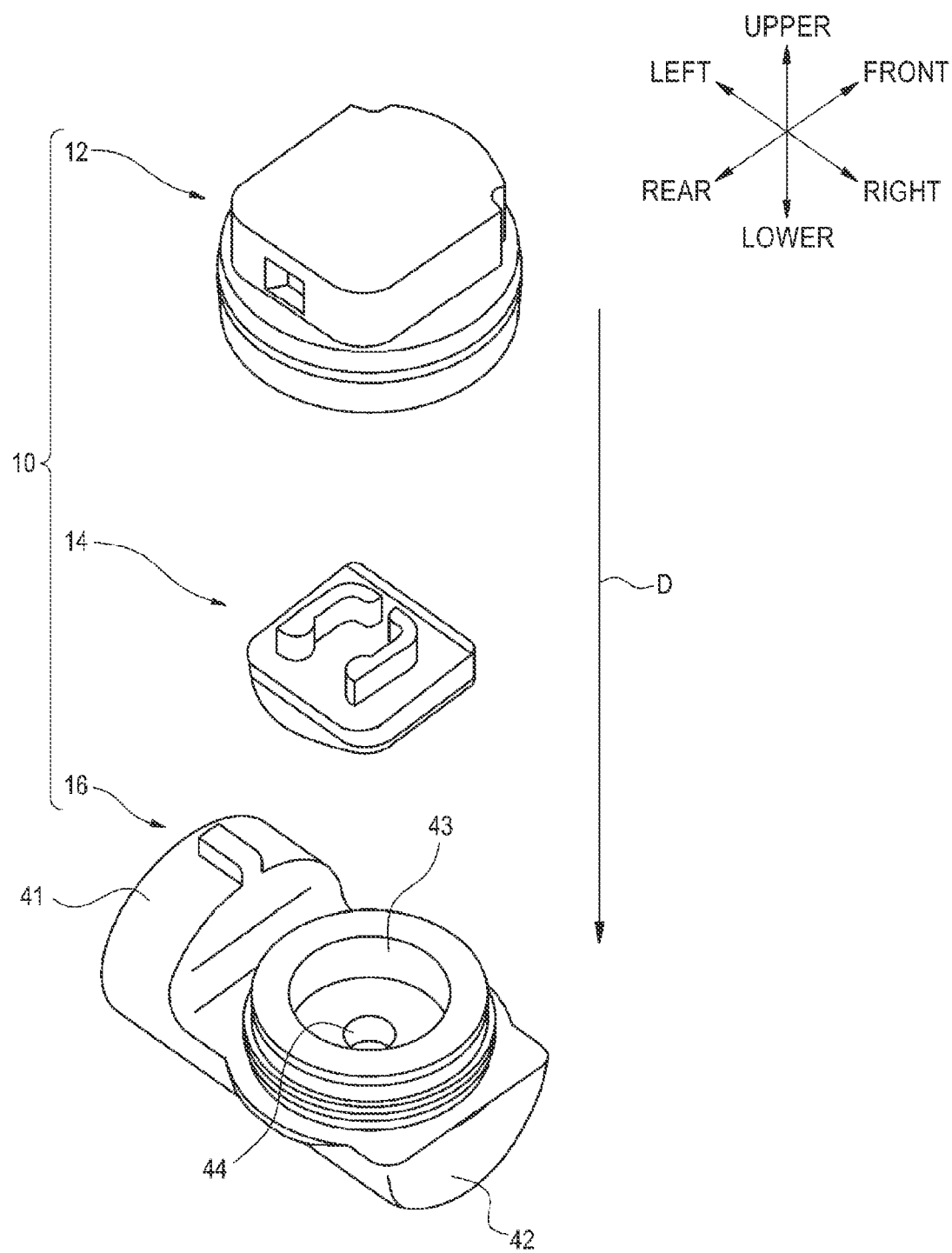
FIG. 2 is an exploded perspective view of an injection nozzle included in the sensor cleaner of FIG. 1.

FIG. 1 is a perspective view of a sensor cleaner 1 according to an embodiment. FIG. 2 is an exploded perspective view of an injection nozzle 10 included in the sensor cleaner 1. The sensor cleaner 1 is a cleaner for cleaning foreign matters attached to an external sensor (not shown; an example of the object to be cleaned) mounted on a vehicle and acquiring information outside the vehicle by blowing cleaning liquid (an example of the cleaning medium) to the external sensor. Examples of the external sensor include a LiDAR, a camera, a millimeter wave sensor, and the like.

As shown in FIGS. 1 and 2, the sensor cleaner 1 includes a cylinder 2, a piston 3, and a pair of injection nozzles 10, 10 (an example of the vehicle cleaner nozzle).

The cylinder 2 is formed in a cylindrical shape, and a connection portion 4 is formed on the rear side thereof. A hose connected to a cleaning liquid tank (not shown) in which a cleaning liquid is stored is connected to the connection portion 4, so that the cleaning liquid is supplied from the cleaning liquid tank into the cylinder 2. The cylinder is provided in an opening portion (not shown; corresponding to a second opening portion) formed in a part of a body panel (not shown) of the vehicle (not shown).

The piston 3 is slidably accommodated in the cylindrical cylinder 2. The piston 3 can move forward and backward along the central axis of the cylinder 2.

The injection nozzles 10, 10 are provided in pairs on the left and right in the vicinity of the leading end of the piston 3. The injection nozzles 10, 10 are nozzles capable of injecting cleaning liquid toward a sensor (not shown) of a vehicle. The pair of injection nozzles 10, 10 has the same configuration. Therefore, in the following description, the injection nozzle 10 on the right side will be described. Meanwhile, the injection nozzle 10 may be provided only on one side in the vicinity of the leading end of the piston 3.

The injection nozzle 10 includes a nozzle housing 12, a nozzle chip 14, and a nozzle holder 16. The nozzle housing 12 accommodates the nozzle chip 14 therein. The nozzle housing 12 is assembled to the nozzle holder 16 in a state where the nozzle chip 14 is accommodated in the nozzle housing 12. As shown in FIG. 2, the nozzle housing 12, the nozzle chip 14, and the nozzle holder 16 can be assembled along the same direction D. That is, the nozzle housing 12 accommodates the nozzle chip 14 along the direction D and is assembled to the nozzle holder 16 along the direction D in a state where the nozzle chip 14 is accommodated.

Figure 3A:
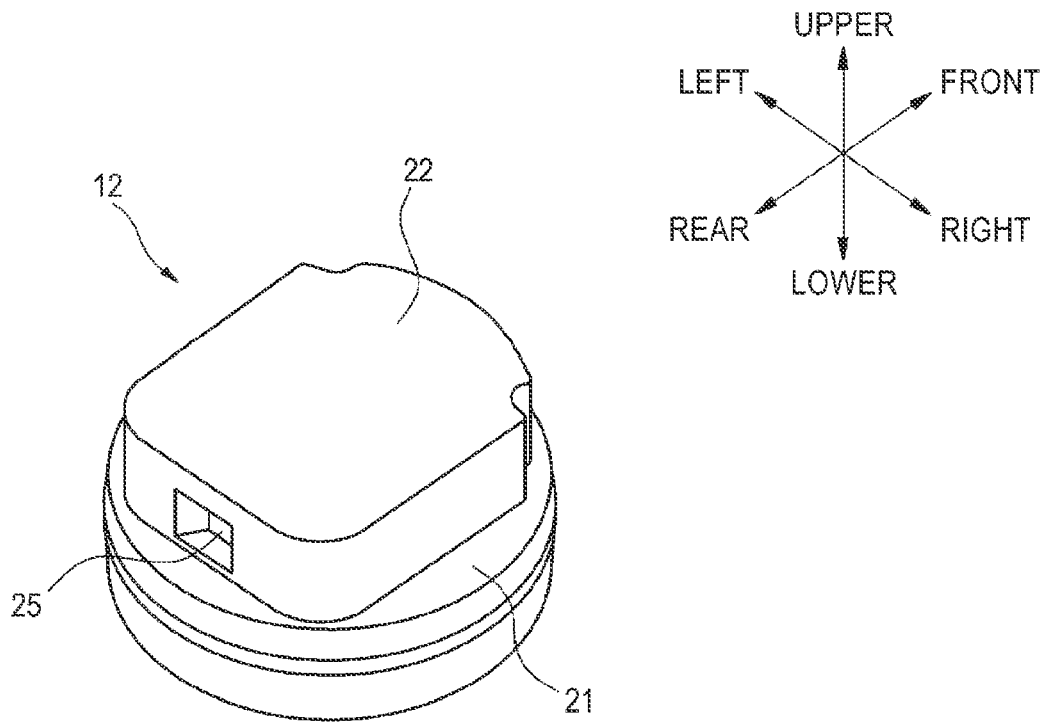
FIG. 3A is a top perspective view of a nozzle housing included in the injection nozzle of FIG. 2.
Figure 3B:
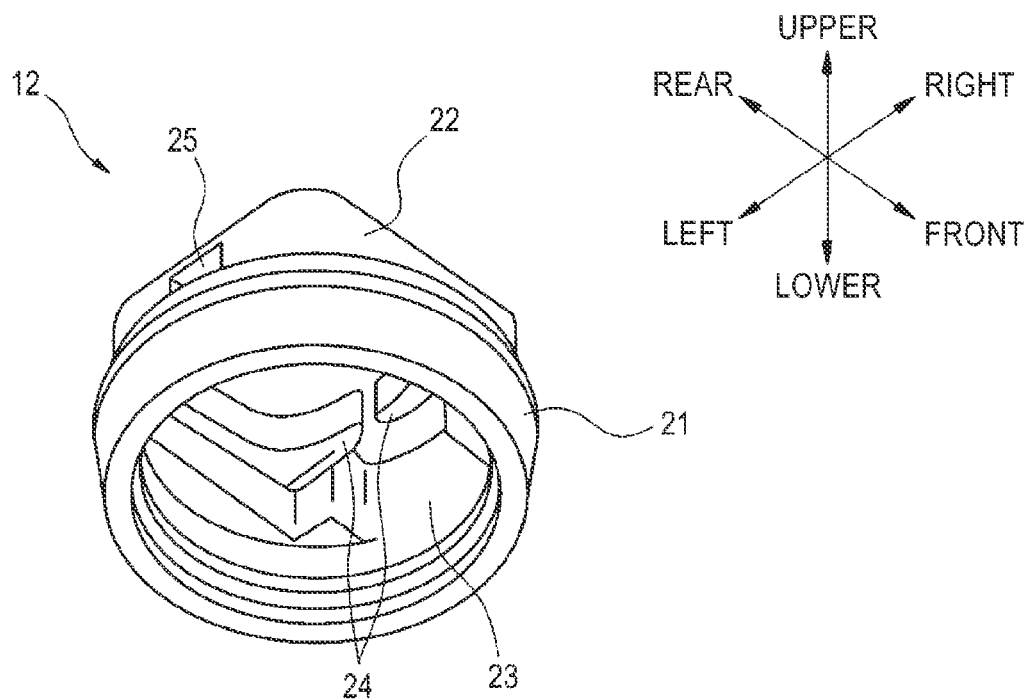
FIG. 3B is a bottom perspective view of the nozzle housing.

FIG. 3A is a top perspective view of the nozzle housing 12, and FIG. 3B is a bottom perspective view of the nozzle housing 12.

As shown in FIGS. 3A and 3B, the nozzle housing 12 has a cylindrical base part 21, and a chip accommodation part 22 provided above the base part 21. The interior of the base part 21 and the chip accommodation part 22 function as an accommodation space 23. A protruding portion 24 for forming an oscillation chamber 50 (to be described later) is provided to protrude into the accommodation space 23. An injection port 25 for injecting cleaning liquid toward an external sensor is formed on the rear side of the chip accommodation part 22.

Figure 4A:
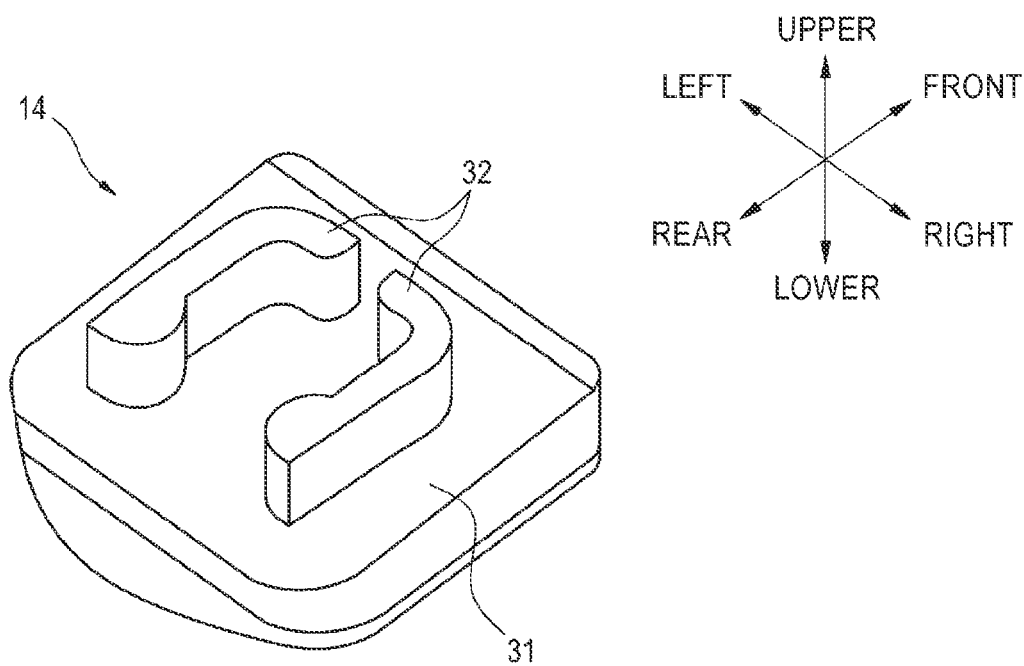
FIG. 4A is a top perspective view of a nozzle chip included in the injection nozzle of FIG. 2.
Figure 4B:
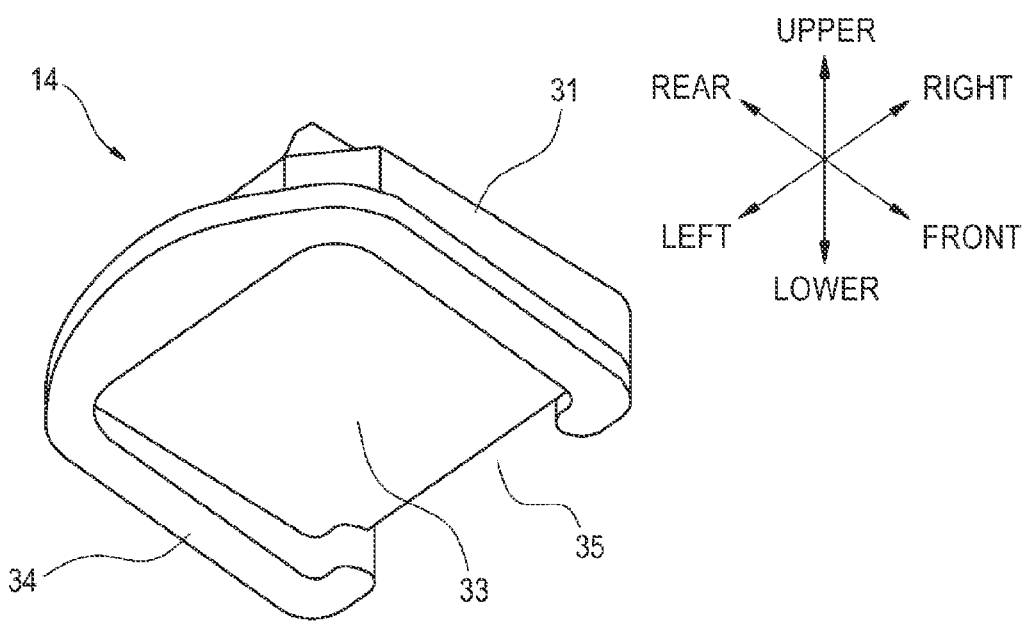
FIG. 4B is a bottom perspective view of the nozzle chip.

FIG. 4A is a top perspective view of the nozzle chip 14, and FIG. 4B is a bottom perspective view of the nozzle chip 14. As shown in FIGS. 4A and 4B, the nozzle chip 14 has a flat base part 31, and a pair of protruding portions 32 provided so as to protrude upward from the base part 31. Further, a recessed portion 33 is formed on a bottom surface of the base part 31 so as to be recessed upward. The recessed portion 33 is surrounded by a frame portion 34 constituting a part of the base part 31. The front side of the frame portion 34 is cut out. This cut-out part 35 constitutes a communication path 52 through which cleaning liquid flows from the recessed portion 33 to the oscillation chamber 50 (see FIGS. 7 and 8) in a state where the nozzle chip 14 is accommodated in the nozzle housing 12.

Returning to FIG. 2, the nozzle holder 16 has a piston connection portion 41 connected to the piston 3, and a nozzle holding portion 42 provided so as to extend rightward from the piston connection portion 41. A cylindrical nozzle connection portion 43 is provided on an upper surface of the nozzle holding portion 42. The base part 21 of the nozzle housing 12 is connected to the nozzle connection portion 43, so that the nozzle housing 12 is assembled to the nozzle holder 16. An opening portion 44 is formed inside the nozzle connection portion 43.

Figure 6:
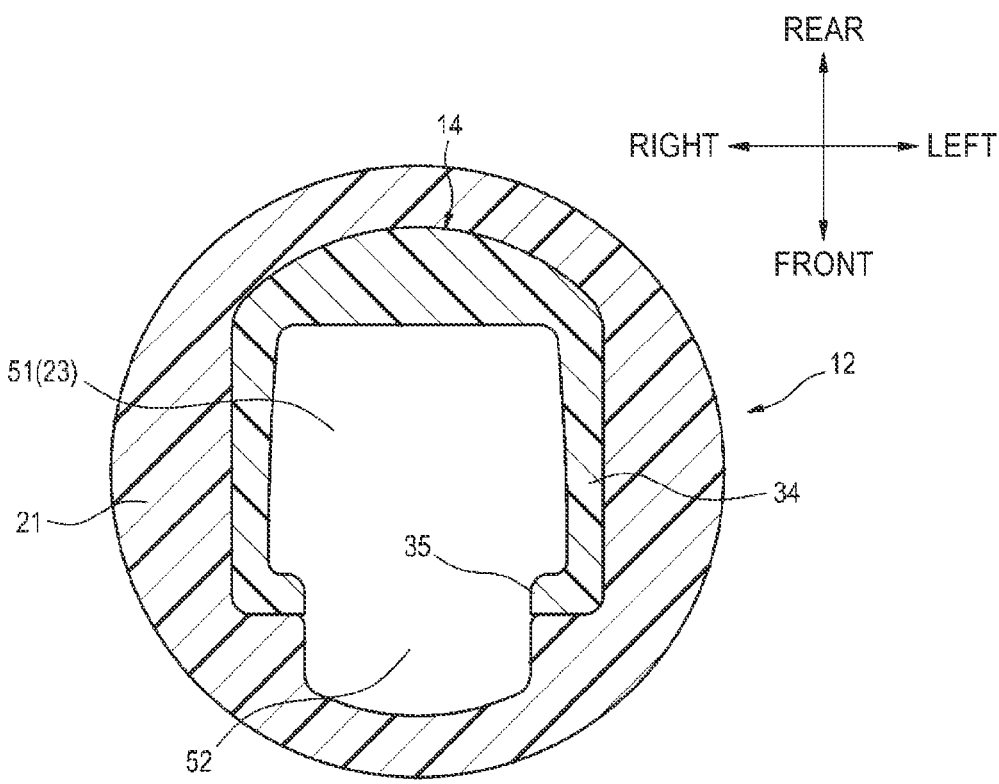
FIG. 6 is a sectional view taken along the line A-A in FIG. 5.
Figure 7:
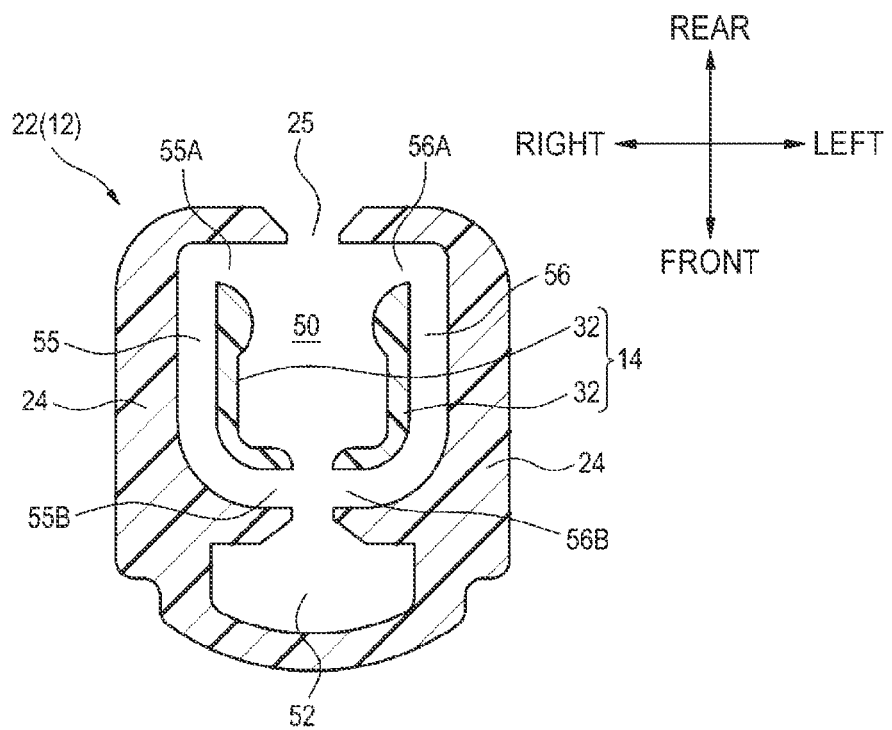
FIG. 7 is a sectional view taken along the line B-B in FIG. 5.
Figure 8:
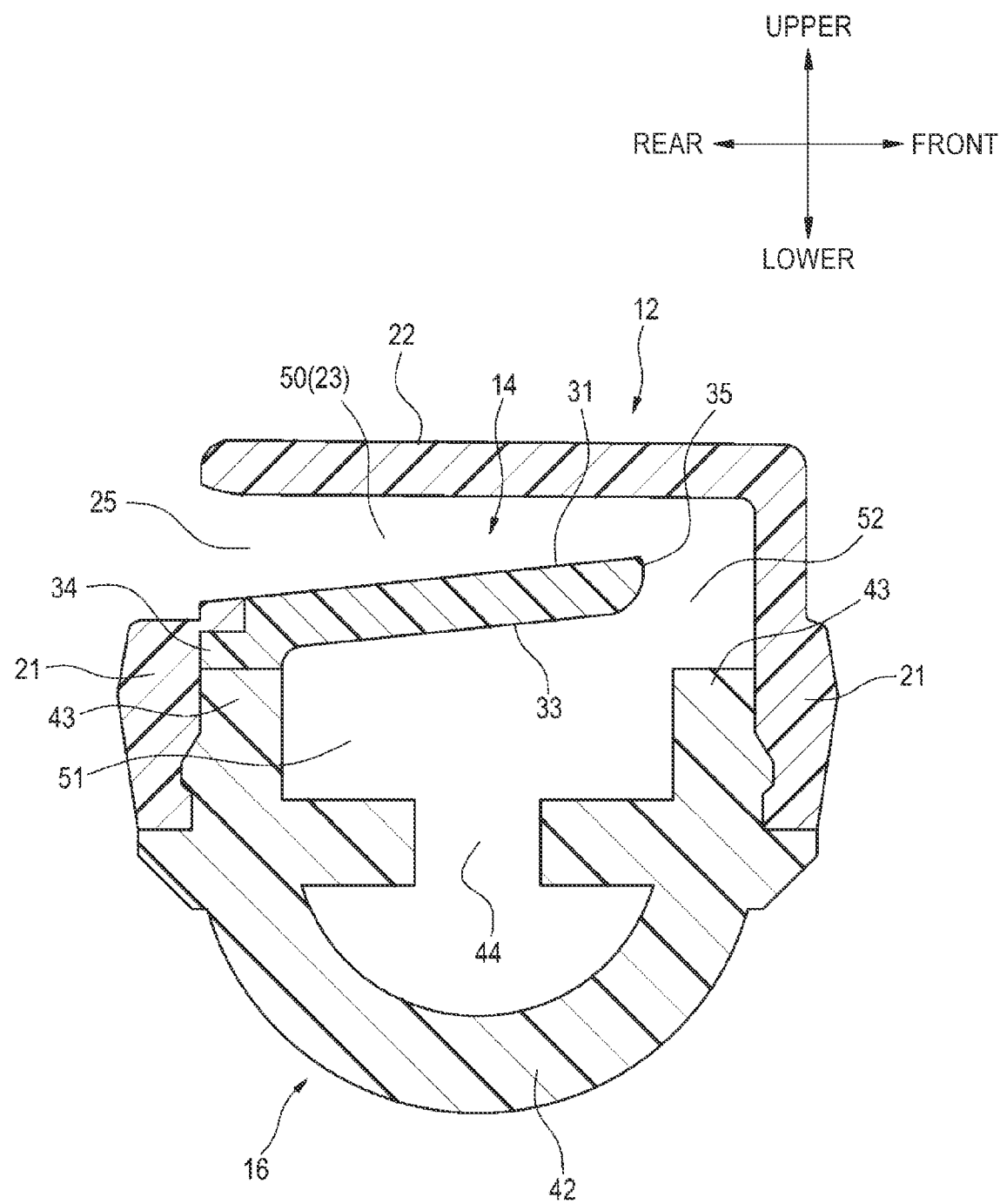
FIG. 8 is a sectional view taken along the line C-C in FIG. 5.

FIG. 5 is a side view of the front side of the sensor cleaner 1. FIG. 6 is a sectional view taken along the line A-A in FIG. 5, FIG. 7 is a sectional view taken along the line B-B in FIG. 5, and FIG. 8 is a sectional view taken along the line C-C in FIG. 5. As shown in FIGS. 6 and 8, in a state where the nozzle housing 12 accommodating the nozzle chip 14 is assembled to the nozzle holder 16, a space 51 is defined between the recessed portion 33 of the nozzle chip 14 and the nozzle connection portion 43 of the nozzle holder 16. Further, the oscillation chamber 50 (the accommodation space 23) is defined between the chip accommodation part 22 of the nozzle housing 12 and the base part 31 of the nozzle chip 14. Furthermore, the communication path 52 communicating the space 51 and the oscillation chamber 50 with each other is defined by the chip accommodation part 22 of the nozzle housing 12 and the cut-out portion 35 of the nozzle chip 14. In this manner, the cleaning liquid supplied from the connection portion 4 of the cylinder 2 passes through the inside of the nozzle holding portion 42 via the piston connection portion 41, is further supplied to the space 51 via the opening portion 44, and then, is supplied to the oscillation chamber 50 via the communication path 52.

Figure 9:
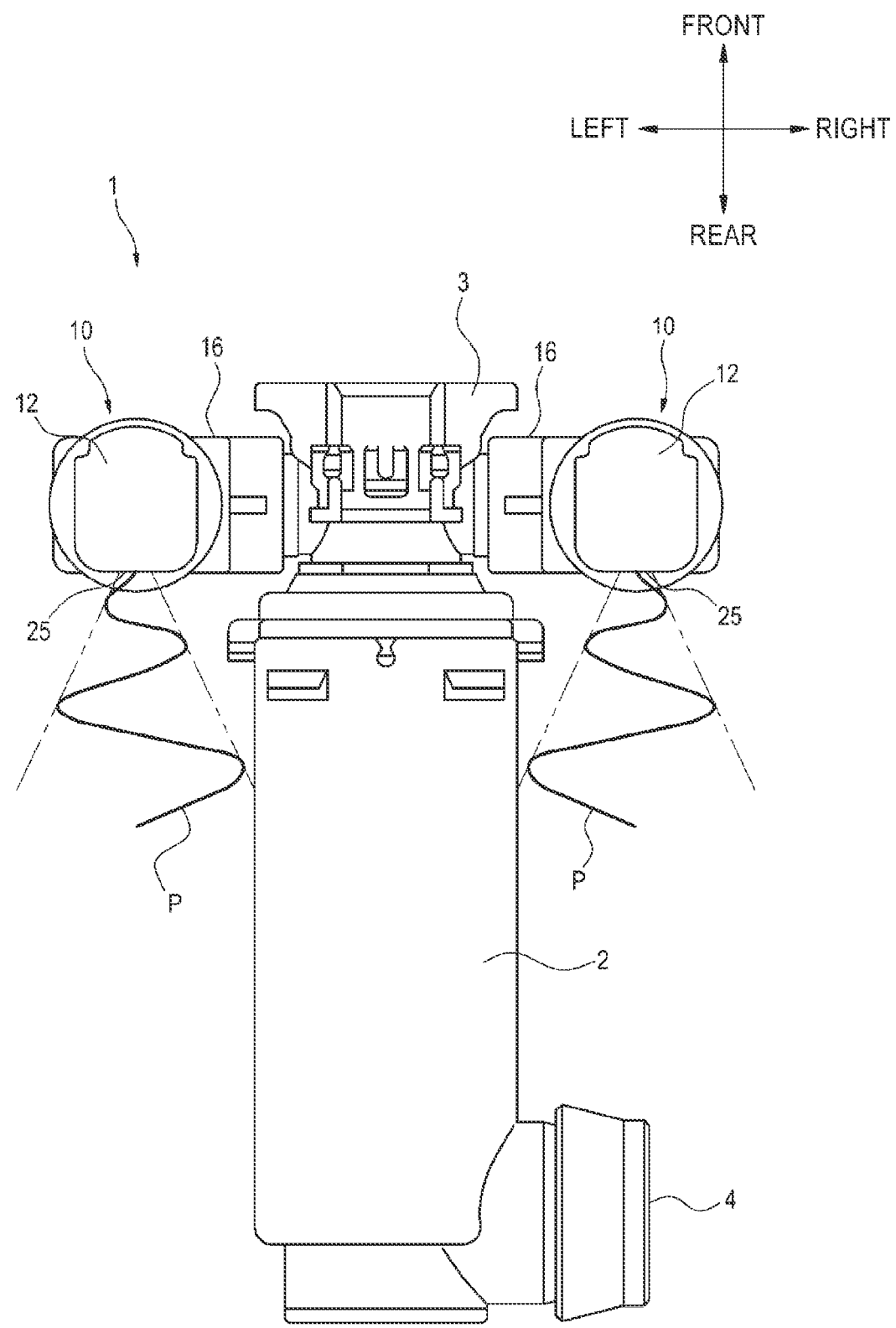
FIG. 9 is a top view of the sensor cleaner showing a state in which cleaning liquid is injected from the injection nozzle.

As shown in FIG. 7, the injection nozzle 10 functions as a fluidics type nozzle (swinging injection nozzle) by means of the oscillation chamber 50 which is formed by the chip accommodation part 22 of the nozzle housing 12 and the nozzle chip 14. The fluidics type nozzle refers to a nozzle that performs control by interfering the flow of fluid and deflecting its flow path. As shown in FIG. 9, the injection nozzle 10 as the fluidics type nozzle can change an injection direction P of the cleaning liquid in the left and right direction by deflecting the flow path of the cleaning liquid injected from the injection port 25.

Specifically, as shown in FIG. 7, in a state where the nozzle chip 14 is accommodated in the chip accommodation part 22 of the nozzle housing 12, the communication path 52, the oscillation chamber 50, a pair of feedback flow paths 55, 56, and the injection port 25 are formed inside the injection nozzle 10. The oscillation chamber 50 is formed continuously with the communication path 52, and the cleaning liquid is supplied into the oscillation chamber 50 from the communication path 52.

The pair of feedback flow paths 55, 56 are flow paths defined between the protruding portion 24 of the chip accommodation part 22 and the protruding portions 32 of the nozzle chip 14 and are respectively provided on the left and right sides of the oscillation chamber 50. The feedback flow paths 55, 56 have inlets 55A, 56A opening to the oscillation chamber 50 on the outlet side of the oscillation chamber 50 (on the side of the injection port 25) and outlets 55B, 56B opening to the oscillation chamber 50 on the inlet side of the oscillation chamber 50 (on the side of the communication path 52). In this way, the feedback flow paths 55, 56 are configured to respectively branch and guide a part of the cleaning liquid fed from the communication path 52 to the oscillation chamber 50 from the inlets 55A, 56A to the outlets 55B, 56B and return the cleaning liquid to the oscillation chamber 50 again.

Specifically, a part of the cleaning liquid flowing into the oscillation chamber 50 from the communication path 52 first flows into the feedback flow path 55 through the inlet 55A of the feedback flow path 55 and flows into the oscillation chamber 50 through the outlet 55B. Subsequently, a part of the cleaning liquid in the oscillation chamber 50 flows into the feedback flow path 56 through the inlet 56A of the feedback flow path 56 and flows into the oscillation chamber 50 through the outlet 56B. Subsequently, a part of the cleaning liquid in the oscillation chamber 50 branches again to the feedback flow path 55 and flows again into the oscillation chamber 50 through the outlet 55B. As this cycle is repeated, the cleaning liquid alternately guided by the feedback flow paths 55, 56 becomes a so-called "feedback control flow" to self-oscillate the cleaning liquid flowing through the oscillation chamber 50, so that the cleaning liquid can be swung and injected (diffused and injected) in the left and right direction from the injection port 25. In this manner, the nozzle housing 12 and the nozzle chip 14 are assembled, so that the injection nozzle 10 can be configured as the fluidics type nozzle. As a result, the injection nozzle 10 can inject the cleaning liquid to the external sensor at a high pressure while swinging the cleaning liquid in the left and right direction.

Figure 10:
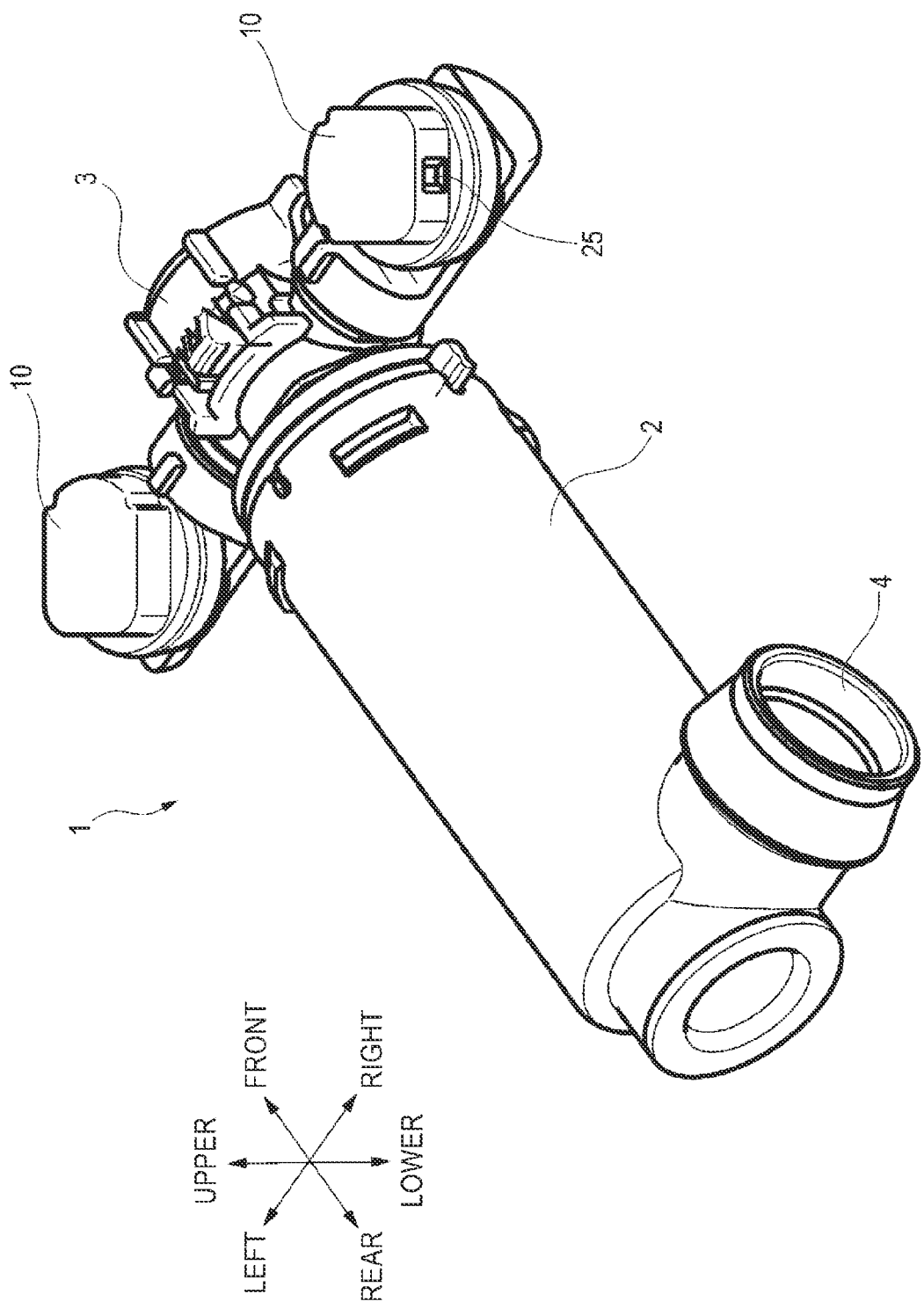
FIG. 10 is a perspective view of the sensor cleaner showing a pivoted state of the injection nozzle.
Figure 11:
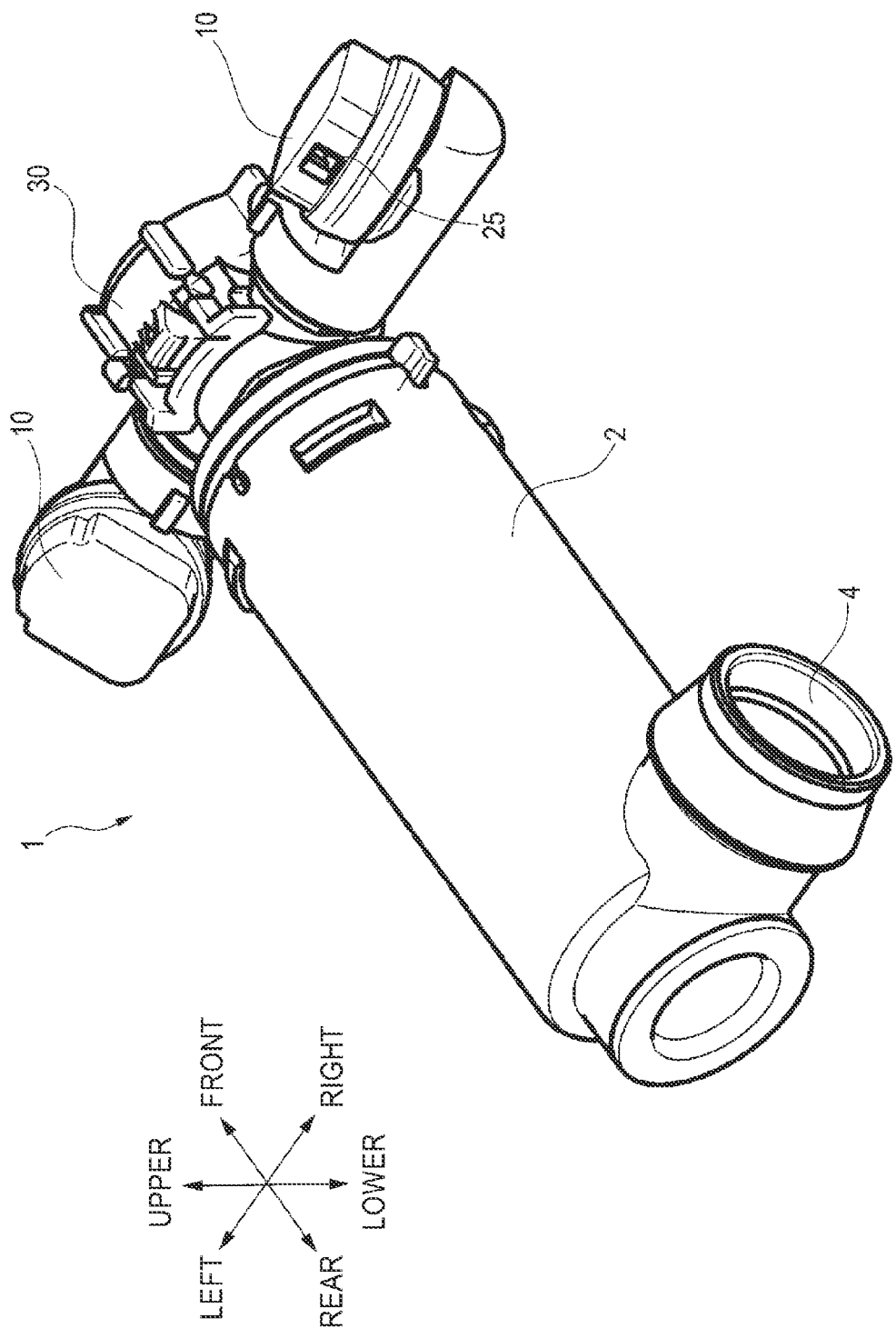
FIG. 11 is a perspective view of the sensor cleaner showing a pivoted state of the injection nozzle.

FIGS. 10 and 11 are perspective views of the sensor cleaner 1, showing a pivoted state of the injection nozzle 10. As shown in FIG. 10, the injection nozzle 10 is mounted such that the nozzle housing 12 is pivotable with respect to the nozzle holder 16 about an axis along the upper and lower direction. Further, as shown in FIG. 11, the injection nozzle 10 is mounted such that the nozzle holder 16 is pivotable with respect to the piston 3 about an axis along the left and right direction. In this manner, by appropriately pivoting the nozzle housing 12 and the nozzle holder 16 when attaching the injection nozzle 10 to the piston 3, the injection port 25 of the injection nozzle 10 can be oriented to an appropriate position according to the positional relationship between the external sensor and the injection nozzle 10. In this way, the position of the injection nozzle 10 can be adjusted so that the cleaning liquid appropriately strikes the external sensor.

As described above, the injection nozzle 10 for the sensor cleaner 1 according to the present embodiment includes the nozzle housing 12 (an example of the housing), the nozzle chip 14 accommodated in the interior of the nozzle housing 12, and the nozzle holder 16 (an example of the holder) for supporting the nozzle housing 12 in a state of accommodating the nozzle chip 14. Further, in the injection nozzle 10, the nozzle chip 14 is accommodated in the nozzle housing 12, so that the feedback flow paths 55, 56 for swinging and injecting the cleaning liquid are formed. According to this configuration, the feedback flow paths 55, 56 are formed between the nozzle housing 12 and the nozzle chip 14 accommodated in the nozzle housing 12, so that the cleaning liquid can be swung and injected. Further, since the nozzle housing 12 itself is configured as a part of a member for forming the feedback flow paths 55, 56, the nozzle housing 12 and the nozzle chip 14 can be formed in a small size, and the injection nozzle 10 can be miniaturized.

Further, according to the injection nozzle 10 of the present embodiment, the nozzle housing 12 has the inner wall (the protruding portion 24) for forming the accommodation space 23 (first opening portion) in which the nozzle chip 14 is accommodated, and the nozzle chip 14 has the pair of protruding portions 32 forming the oscillation chamber 50 (oscillation space) between the accommodation space 23 of the nozzle housing 12 and the nozzle chip 14. In a state where the nozzle chip 14 is accommodated in the nozzle housing 12, the pair of feedback flow paths 55, 56 is formed between the protruding portion 24 of the nozzle housing 12 and each of the pair of protruding portions 32 of the nozzle chip 14. According to this configuration, the oscillation chamber 50 and the feedback flow paths 55, 56 can be easily formed with a simple configuration merely to accommodate the nozzle chip 14 in the accommodation space 23 of the nozzle housing 12.

Further, according to the injection nozzle 10 of the present embodiment, when assembling the injection nozzle 10 to the piston 3, first, the nozzle chip 14 is assembled to the nozzle housing 12 along the direction D (an example of the first direction) shown in FIG. 2. In this way, the feedback flow paths 55, 56 for swinging and injecting the cleaning liquid from the injection port 25 are formed. Subsequently, the nozzle housing 12 in a state of accommodating the nozzle chip 14 is assembled to the nozzle holder 16 supported by the piston along the direction D. In this way, the nozzle housing 12, the nozzle chip 14, and the nozzle holder 16, which constitute the injection nozzle 10, can be assembled along the same direction (direction D), so that it is possible to improve the work efficiency at the time of assembling the injection nozzle 10.

Meanwhile, the disclosure is not limited to the above-described embodiments, but can be freely modified or improved as appropriate. In addition, materials, shapes, dimensions, numerical values, forms, numbers, and arrangement places and the like of each component in the above-described embodiments are arbitrary and are not limited, as long as the disclosure can be achieved.

The injection nozzle 10 in the above embodiments is attached to the sensor cleaner 1 for injecting a cleaning liquid to an external sensor that acquires information outside a vehicle. However, the injection nozzle 10 is not limited to this example. The injection nozzle having the above configuration may be attached to a lamp cleaner which is used for cleaning a vehicle lamp by injecting a cleaning liquid to the vehicle lamp. The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby by enabling others skilled in the art to understand the invention for various embodiments and with various modifications as are suited to the particular use contemplated. It is intended that the scope of the invention be defined by the following claims and their equivalents.

1: Sensor cleaner, 2: Cylinder, 3: Piston, 4: Connection portion, 10: Injection nozzle (an example of the vehicle cleaner nozzle), 12: Nozzle housing (an example of the housing), 14: Nozzle chip, 16: Nozzle holder (an example of the holder), 21: Base part, 22: Chip accommodation part, 23: Accommodation space, 24: Protruding portion, 25: Injection port, 31: Base part, 32: A pair of protruding portions, 33: Recessed portion, 34: Frame portion, 35: Cut-out portion, 41: Piston connection portion, 42: Nozzle holding portion, 43: Nozzle connection portion, 44: Opening portion.

The invention claimed is:
1. A method of assembling a vehicle cleaner nozzle provided in a vicinity of a leading end of a piston accommodated to be movable forward and backward with respect to a cylinder so as to inject a cleaning medium on an object to be cleaned which is mounted on a vehicle, the method comprising:

assembling a nozzle chip to a housing along a first direction so as to form a feedback flow path for swinging and injecting the cleaning medium by accommodating the nozzle chip in an interior of the housing, and assembling the housing in a state where the housing accommodates the nozzle chip to a holder supported by the piston along the first direction so that the nozzle chip is sandwiched between the housing and the holder along the first direction.

2. A method of assembling a vehicle cleaner nozzle for injecting a cleaning medium on an object to be cleaned that is mounted on a vehicle, comprising:

providing a nozzle chip having a pair of protruding portions that form an oscillation space therebetween, providing a housing having a first inner wall and a second inner wall that form a first opening portion, assembling the nozzle chip in the opening porting of the housing along a first direction so as to form a feedback flow path surrounded by the first inner wall and the second inner wall of the housing and each of the pair of protruding portions of the nozzle chip, and assembling the housing in a state where the housing accommodates the nozzle chip to a holder supported by a piston along the first direction.

\* \* \* \* \*